US012420246B2

(12) United States Patent
Meili

(10) Patent No.: US 12,420,246 B2
(45) Date of Patent: Sep. 23, 2025

(54) FLUID MIXING DEVICE

(71) Applicants: Stefan F. Meili, North Vancouver (CA); NORAM INTERNATIONAL LIMITED, Dublin (IE)

(72) Inventor: Stefan F. Meili, North Vancouver (CA)

(73) Assignee: NORAM ENGINEERING AND CONSTRUCTORS LTD., Vancouver (CA)

( * ) Notice: Subject to any disclaimer, the term of this patent is extended or adjusted under 35 U.S.C. 154(b) by 889 days.

(21) Appl. No.: 17/268,889

(22) PCT Filed: Nov. 15, 2018

(86) PCT No.: PCT/IB2018/059010
§ 371 (c)(1),
(2) Date: Feb. 16, 2021

(87) PCT Pub. No.: WO2020/058751
PCT Pub. Date: Mar. 26, 2020

(65) Prior Publication Data

US 2021/0308640 A1 Oct. 7, 2021

Related U.S. Application Data

(60) Provisional application No. 62/734,056, filed on Sep. 20, 2018.

(51) Int. Cl.
*B01F 25/00* (2022.01)
*B01F 23/45* (2022.01)
(Continued)

(52) U.S. Cl.
CPC .......... *B01F 25/4315* (2022.01); *B01F 23/45* (2022.01); *B01F 25/4316* (2022.01);
(Continued)

(58) Field of Classification Search
CPC .............. B01F 25/4316; B01F 25/4315; B01F 2101/2204
See application file for complete search history.

(56) References Cited

U.S. PATENT DOCUMENTS 4,758,098 A 7/1988 Meyer
5,323,661 A 6/1994 Cheng
(Continued)

FOREIGN PATENT DOCUMENTS

DE 10 2014 223 382 A 5/2016
EP 2 463 015 A1 6/2012

OTHER PUBLICATIONS

W. R. Dean, M. A., 'Fluid motion in a curved channel', proceedings of the royal society, vol. 121, Issue 787, pp. 402-420, 1928.
(Continued)

*Primary Examiner* — Anshu Bhatia
(74) *Attorney, Agent, or Firm* — NYEMASTER GOODE, P.C.

(57) ABSTRACT

A fluid mixing device (10) for use in chemical reactions involving two or more immiscible fluid phases. It mixes the reactants and prevents phase separation, particularly in pipe bends. The device (10) for mixing fluids flowing through a pipe (16), comprises a plate (12) having a flowpath (14) therethrough and two or more tabs (20) extending from the plate into the flowpath at an angle (24) from the plane (22) of the plate. The tabs (20) are formed by first folds (32) in the plate, at least two of the tabs (20A) having a second fold (26) therein, the tabs and first and second folds being arranged to produce two counter-rotating vortices (30) in the fluids passing through the pipe. The device has a plane of symmetry (28) perpendicular to the plane (22) of the plate (12).

18 Claims, 11 Drawing Sheets

(51) Int. Cl.
*B01F 25/431* (2022.01)
*B01F 101/00* (2022.01)

(52) U.S. Cl.
CPC . *B01F 25/431974* (2022.01); *B01F 2025/913* (2022.01); *B01F 2101/2204* (2022.01)

(56) References Cited

U.S. PATENT DOCUMENTS

| | | | | |
|---|---|---|---|---|
| 6,595,682 | B2 | 7/2003 | Mathys et al. | |
| 6,811,302 | B2 | 11/2004 | Fleischli et al. | |
| 7,316,503 | B2 | 1/2008 | Mathys et al. | |
| 7,730,907 | B2 | 6/2010 | Richter | |
| 9,403,133 | B2 | 8/2016 | Baron | |
| 2009/0262599 | A1 | 10/2009 | Kohrs et al. | |
| 2011/0174407 | A1 | 7/2011 | Lundberg et al. | |
| 2011/0174408 | A1 | 7/2011 | Lundberg et al. | |
| 2014/0014270 | A1* | 1/2014 | Shah | B01F 25/4316 366/165.2 |
| 2017/0128894 | A1* | 5/2017 | Zhang | B01F 23/10 |
| 2017/0314443 | A1* | 11/2017 | Simon | F01N 3/2066 |

OTHER PUBLICATIONS

Crawford et al., “Two-Phase Flow Patterns and Void Fractions in Downward Flow Part 1”, Int. J. Multiphase Flow, vol. 11, No. 6 pp. 761-782, 1985.

Phillip M. Ligrani, ‘A Study of Dean Vortex Development and Structure in a Curved Rectangular Channel With Aspect Ratio of 40 at Dean Numbers up to 430’, NASA Contractor Report 46047, 1994.

* cited by examiner

Dispersion Produced Without Mixing Device

Dispersion Produced with Mixing Device

FLUID MIXING DEVICE

BACKGROUND

In many chemical reactions involving two or more immiscible fluid phases, the rate of conversion of reactants to products is limited by the amount of surface area generated between the phases. For example, in the nitration of benzene to form mononitrobenzene using a plug flow reactor, it is important to keep the organic phase and the aqueous phase well mixed and avoid phase separation. Effective mixing elements produce fine dispersions of the reactants to maximize surface area and therefore reaction rate.

Tabbed mixing devices are effective in mixing fluids and solids. Some devices employ three tabs in a staggered arrangement that creates a counter-rotating vortex pair, which is highly effective in mixing fluids. For example, U.S. Pat. No. 4,758,098 (Meyer) describes a tabbed mixing device used to mix solid particles without clogging. U.S. Pat. No. 6,811,302 (Fleischi) and U.S. Pat. No. 7,316,503 (Mathys) disclose that an additive is immediately mixed by a device including three tabs oriented to create a pair of counter-rotating vortices. U.S. Pat. No. 9,403,133 (Baron) discloses three pairs of overlapping tabs arranged around the circumference of a pipe so as to induce a pair of counter-rotating vortices.

Mixing devices formed by folding metal sheets are known in the art. U.S. Pat. No. 6,595,682 (Mathys) discloses a device in which a sheet of metal is folded such that two sets of tabs form two planes that intersect downstream of the flange in which the device is clamped. One embodiment of the device incorporates three tabs oriented to create a pair of counter-rotating vortices.

Mixing devices have been used in conjunction with a piping bend. However, these are designed to reduce or eliminate turbulence and are not effective in preventing phase separation. U.S. Pat. No. 5,323,661 (Cheng) and U.S. Pat. No. 7,730,907 (Richter) disclose devices in which the fluid is spun to create a single, full diameter vortex before being passed through the elbow. US 2011/0174407 (Lundberg) discloses a mixing device installed downstream of a pipe bend to create a uniform flow field downstream of the device.

There is a need for a mixing element that is simple to fabricate as well as effective in mixing the reactants and preventing phase separation, particularly in pipe bends.

SUMMARY OF THE INVENTION

According to one aspect of the invention, there is provided a mixing device for mixing fluids flowing through a pipe, comprising a plate having a flowpath therethrough and two or more tabs extending from the plate into the flowpath at an angle from the plane of the plate, the tabs being formed by first folds in the plate, at least two of the tabs having a second fold therein, the tabs and first and second folds being arranged to produce two counter-rotating vortices in the fluids passing through the pipe.

According to a further aspect of the invention, the mixing device has a plane of symmetry perpendicular to the plane of the plate and the tabs and first folds and second folds form a pattern that is symmetrical about the plane of symmetry.

According to a further aspect of the invention, there is provided a method of mixing fluids flowing through a pipe having a mixing device upstream of a pipe bend, the mixing device comprising a plate having a flowpath therethrough and two or more tabs extending from the plate into the flowpath at an angle from the plane of the plate, the tabs being formed by first folds in the plate, at least two of the tabs having a second fold therein, the tabs and first folds and second folds being arranged to produce two counter-rotating vortices in a fluid passing through the pipe, the method comprising: (a) flowing the fluids through the pipe in a direction from the mixing device to the pipe bend; (b) forming the counter-rotating vortices in the fluids as the fluids flow past the mixing device; and (c) flowing the fluids past the pipe bend and thereby inducing counter-rotating Dean vortices in the fluids, the Dean vortices being reinforced by the counter-rotating vortices formed by the mixing device.

According to a further aspect of the invention, there is provided a method of reducing phase separation in a flow through a pipe of a mixture of immiscible fluids, the pipe having a mixing device upstream of a pipe bend, the mixing device comprising a plate having a flowpath therethrough and two or more tabs extending from the plate into the flowpath at an angle from the plane of the plate, the tabs being formed by first folds in the plate, at least two of the tabs having a second fold therein, the tabs and first folds and the second folds being arranged to produce two counter-rotating vortices in the fluids passing through the pipe, the method comprising: (a) flowing the fluids through the pipe in a direction from the mixing device to the pipe bend; (b) forming the counter-rotating vortices in the fluids as the fluids flow past the mixing device; and (c) flowing the fluids past the pipe bend and thereby inducing counter-rotating Dean vortices in the fluids, the Dean vortices being reinforced by the counter-rotating vortices formed by the mixing device.

Further aspects of the invention and features of specific embodiments of the invention are described below.

DETAILED DESCRIPTION

Figure 1A:
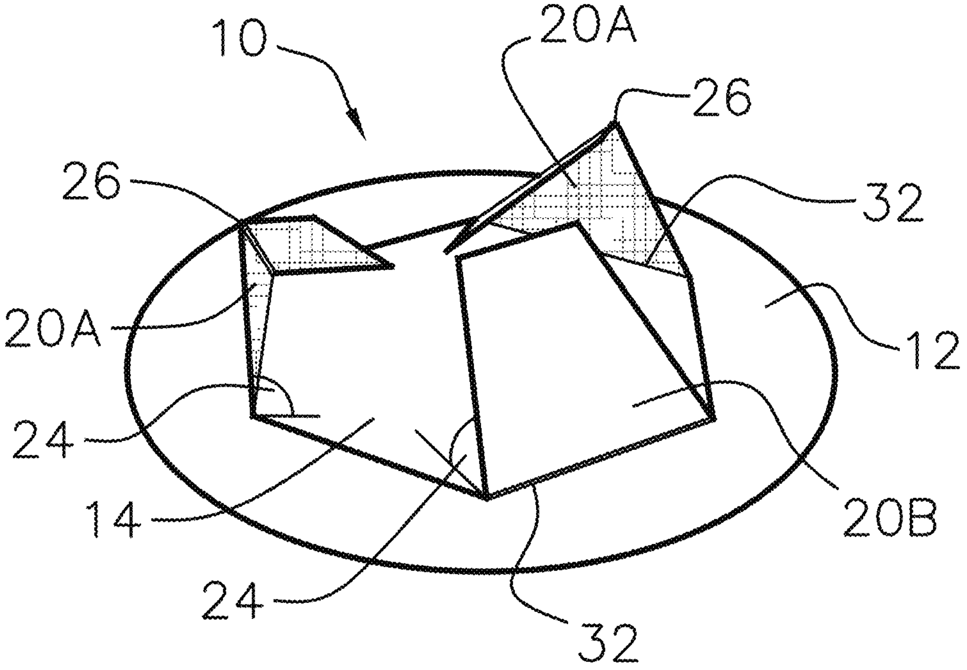
FIGS. 1A to 1C are schematic views of an embodiment of a mixing device according to the invention.

A key concern in the design of reactors processing immiscible fluids is fluid flow stability. Published investigations of two phase flow such as T. J. Crawford, C. B. Weinberger and J. Wesiman, '*Two-Phase Flow Patterns and Void Fractions*

*in Downward Flow Part* 1', Int J. Multiphase Flow, Vol. 11, No. 6 pp. 761-782, 1985 generally categorize observed flow patterns as follows:

Stable 'Dispersed' or 'Bubbly' flow. Discrete, fine bubbles or droplets of the dispersed phase significantly smaller than the pipe diameter are uniformly distributed throughout the continuous phase and faithfully follow the bulk flow.

Chaotic, intermittent and transition flow regimes, typically described as 'Churn', 'Slug' or 'Plug' flow.

Stable regions of Separated flow regimes typically described as 'Stratified,' 'Annular' or 'Falling Film' flow.

An analysis of experimental observations made of the stability of two phase down flow in a reactor model produced a new dimensionless stability parameter (@) that can be used to predict if a section of downflow pipe will operate in a stable bubbly or dispersed flow regime based on three classic dimensionless parameters: Richardson Number (Ri), Void Fraction (B), and Eötvös Number (Eo). These parameters are defined as follows:

$$Ri = \frac{gD|\rho_c - \rho_d|}{\rho_c U^2}$$

$$\beta = \frac{Q_d}{Q_d + Q_c}$$

$$Eo = \frac{|\rho_c - \rho_d|gD^2}{\sigma}$$

$$D = \frac{4A}{P}$$

$$U = \frac{Q_d + Q_c}{A}$$

where: Ri=Richardson Number
β=dispersed phase volumetric fraction
Eo=Eötvös Number
U=bulk fluid velocity
D=hydraulic diameter
A=downflow section cross-sectional area
P=downflow section cross-sectional perimeter
g=gravitational acceleration constant
$\rho_c$=density of continuous phase
$\rho_d$=density of dispersed phase
$Q_c$=volumetric flow of continuous phase
$Q_d$=volumetric flow of dispersed phase, and
σ=interfacial tension.

A support vector machine (SVM) algorithm was used to separate desirable 'Dispersed' and 'Bubbly' flow regimes from unstable or unsafe 'Churn' and 'Annular' flow regimes. A new dimensionless parameter (@) was discovered based on the output of the SVM algorithm that allows the transition from unstable to stable flow regimes to be reliably predicted in extended regions of downward flow.

The parameter ϕ is defined as:

$$\phi = \frac{\beta}{a \cdot \sqrt{Ri} + b \cdot Eo + c}$$

where: ϕ=Stability Parameter
$a=-1.1836\times10^{-1}$
$b=2.2873\times10^{-5}$
$c=1.1904\times10^{-1}$
Ri, Eo and β are as defined above.

Pipe bends in reactors processing two or more immiscible fluids present particular challenges in avoiding phase separation. In the development of the present invention, phase separation was observed as the fluids passed through pipe bends. This separation is attributed to differences in fluid momentum tending to separate the different fluids. Changes in fluid direction are known to separate fluids and particles with different densities. In fact, it is known to use this effect to remove small particles and droplets from gas and liquid flows. However, bulk phase separation would negatively affect the performance of a chemical reactor.

Figure 3:
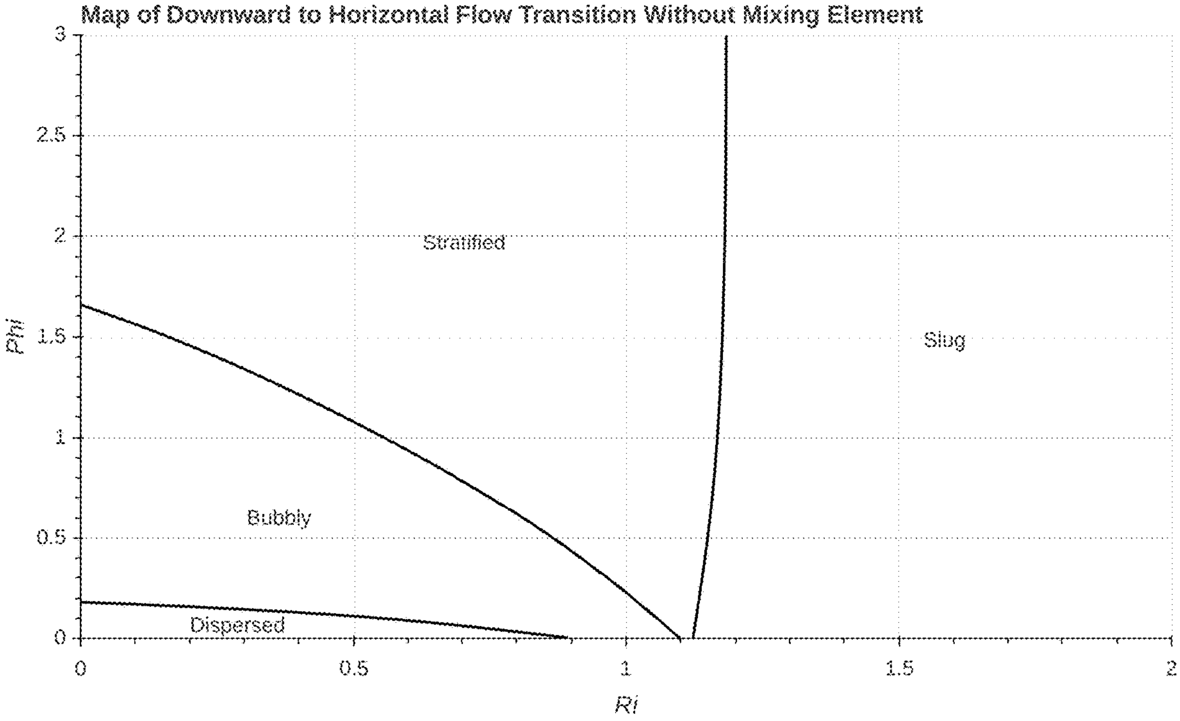
FIG. 3 is a flow map showing flow regimes in a horizontal pipe located immediately after a section of downward flowing pipe not having a mixing device according to the invention, as related to the parameters $\phi$ and Ri.
Figure 4:
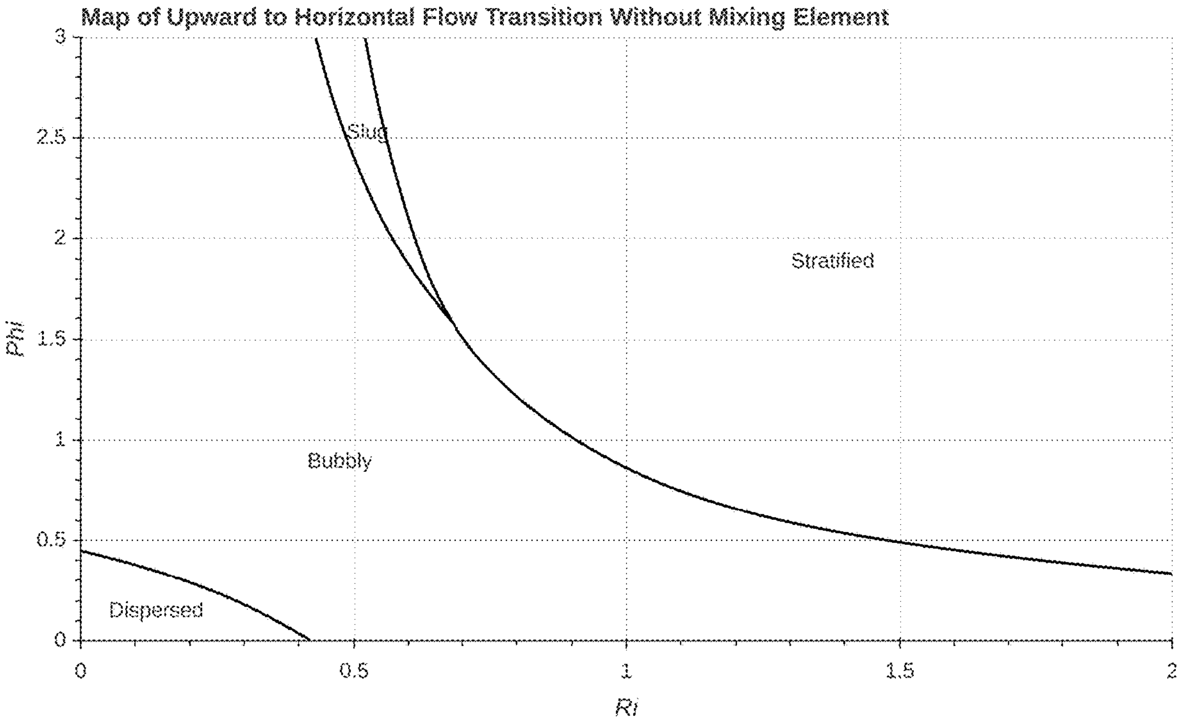
FIG. 4 is a flow map showing flow regimes in a horizontal pipe located immediately after a section of upward flowing pipe not having a mixing device according to the invention, as related to the parameters $\phi$ and Ri.

Phase separation is more likely to occur when external forces such as gravity reinforce the changes in fluid momentum. For instance, in a system with a heavy continuous phase and a light dispersed phase, the transition from downward to horizontal flow is more likely to result in phase separation than the transition from upward flow to horizontal flow. Similarly, in a system with a light continuous phase and a heavy dispersed phase, the transition from upward flow to horizontal flow is more likely to cause phase separation. This is illustrated in the flow maps of FIGS. 3 and 4, showing flow regimes present in a reactor processing a heavy continuous phase and a light dispersed phase in a transition from downward flow to horizontal flow, and a transition from upward flow to horizontal flow, respectively.

Pipe bends are also known to induce a secondary flow pattern consisting of one or more pairs of counter-rotating vortices known as Dean vortex flow. The Dean Number ($De=Re(d/Ri)^{0.5}$) (W. R. Dean, M. A., 'Fluid motion in a curved channel', proceedings of the royal society, Vol. 121, Issue 787, pp. 402-420, 1928) is used to characterize this behavior, where Re is the commonly known flow Reynold's Number. Dean vortex flow becomes stable when De exceeds 64 and can exist in fluid conduits having round, square or rectangular cross-section ('Phillip M. Ligrani, '*A Study of Dean Vortex Development and Structure in a Curved Rectangular Channel With Aspect Ratio of* 40 *at Dean Numbers up to* 430', NASA Contractor Report 46047, 1994).

During testing, it was determined that a fluid momentum effect similar to Dean vortices persisted even when bulk phase separation occurred around the pipe bend. A mixing device as disclosed herein can be used to reinforce the Dean vortices and thereby prevent or delay bulk phase separation.

Figure 1B:
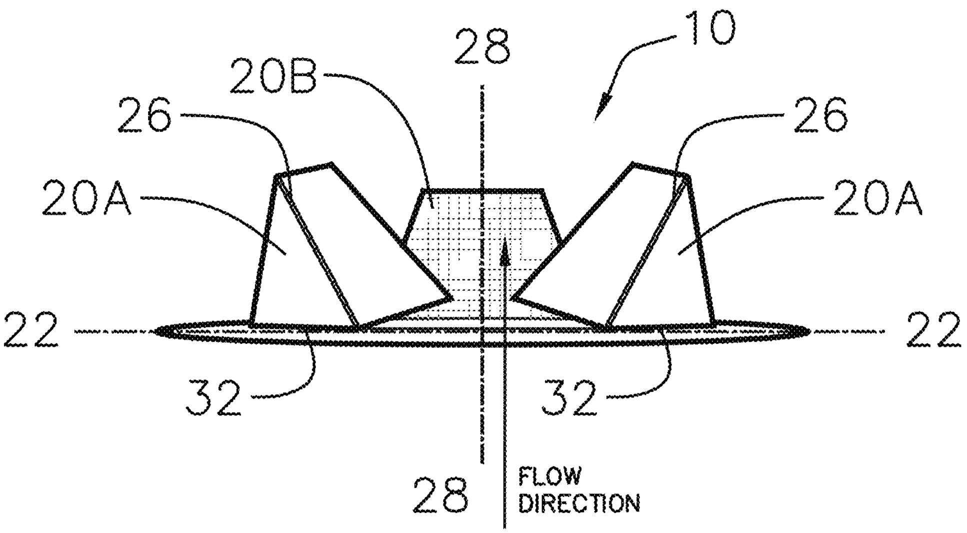
Figure 1C:
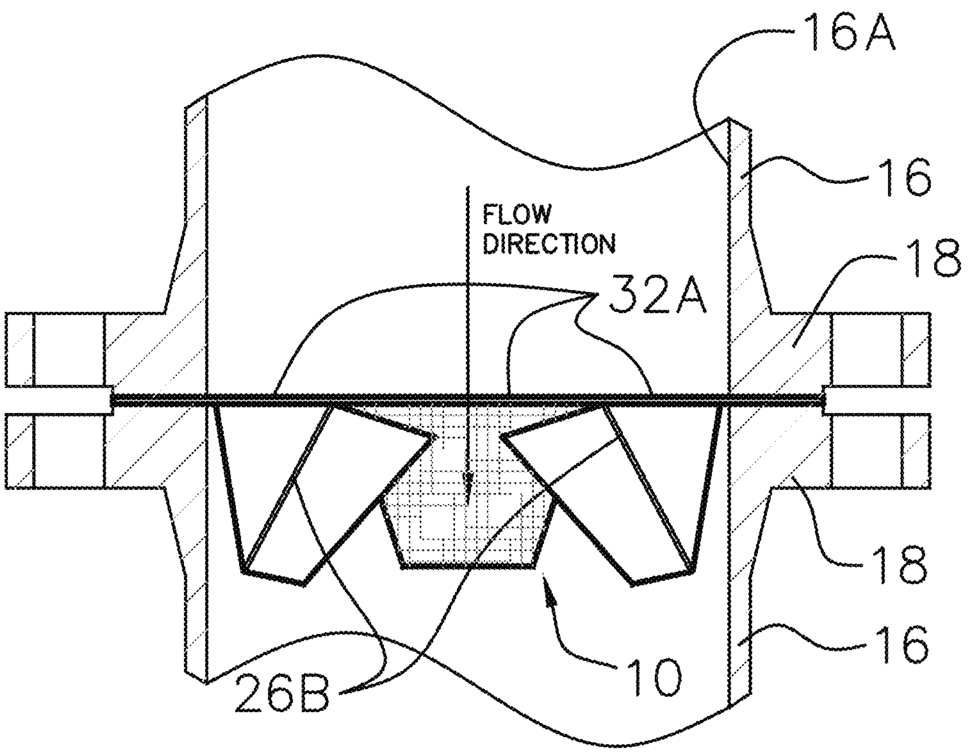

Referring to FIGS. 1A to 1C, which illustrate one embodiment of the invention, the mixing device 10 comprises a plate 12 having an opening or flowpath 14 therethrough. In use, it is positioned within a pipe 16, being held in place between the flanges 18 of adjacent pipe sections. The mixing device 10 in the embodiment of FIGS. 1A to 1C has three tabs 20 extending from the plane 22 of the plate into the flowpath at an angle 24 from the plane of the plate. Two of the tabs 20A have a fold 26 in the body of the tab, and one tab 20B has no fold in the body of the tab. In this disclosure, the term "tab" includes a member formed by the cutting and folding of a flat plate, such that the member extends out of the plane of the plate.

The mixing device 10 has a plane of symmetry 28 perpendicular to the plane of the plate. The plate 12 is cut and folded about this plane 28 in a geometrically symmetrical manner to form the mixing device. This induces formation of a pair of counter-rotating vortices 30 (shown in FIGS. 2 and 5) in a fluid when the fluid is passed through the mixing device. Internal cuts are made in the plate 12 to form plate sections and the tabs 20 are formed by making folds 32 to fold the plate sections out of the plane of the plate, extending either downstream or upstream.

Figure 2A:
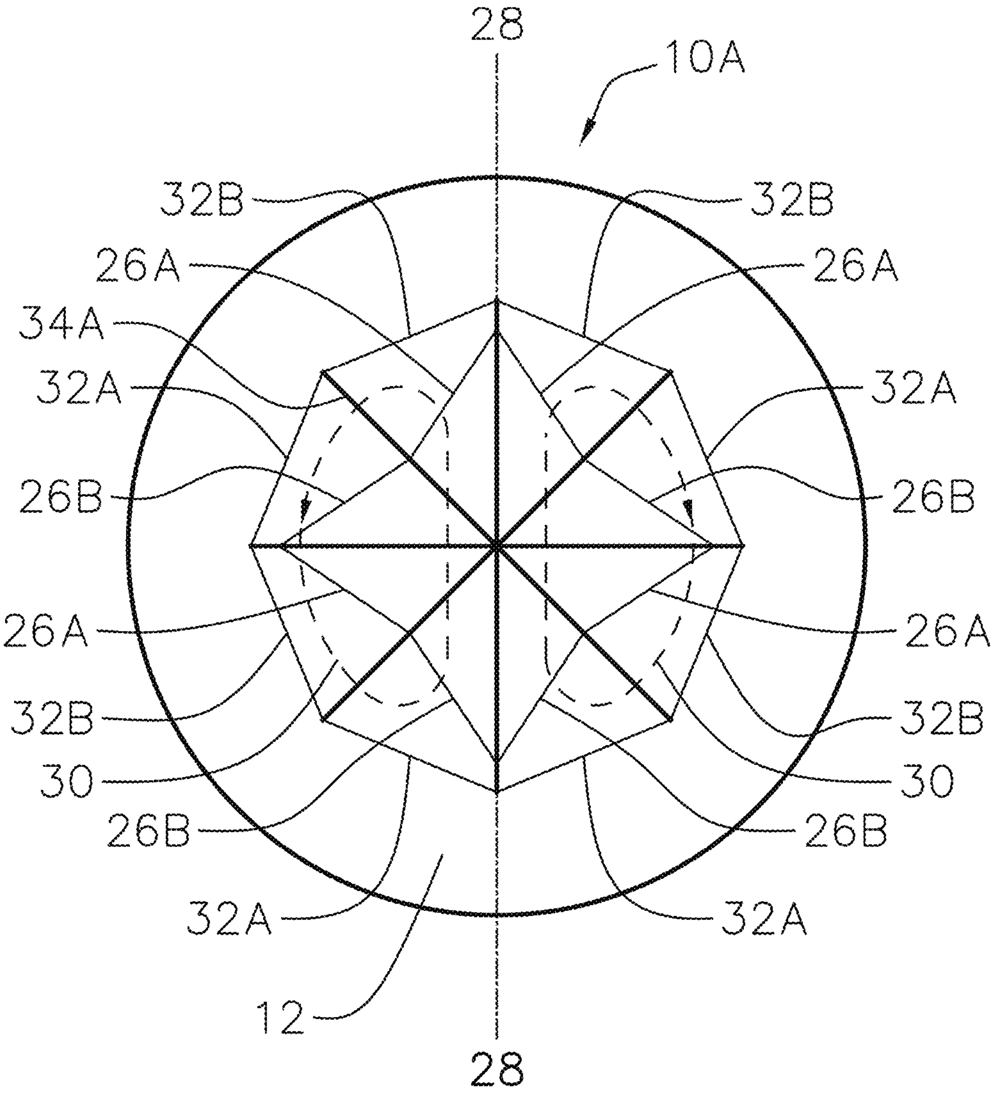
FIGS. 2A to 2C are schematic views of further embodiments of the mixing device.
Figure 2B:
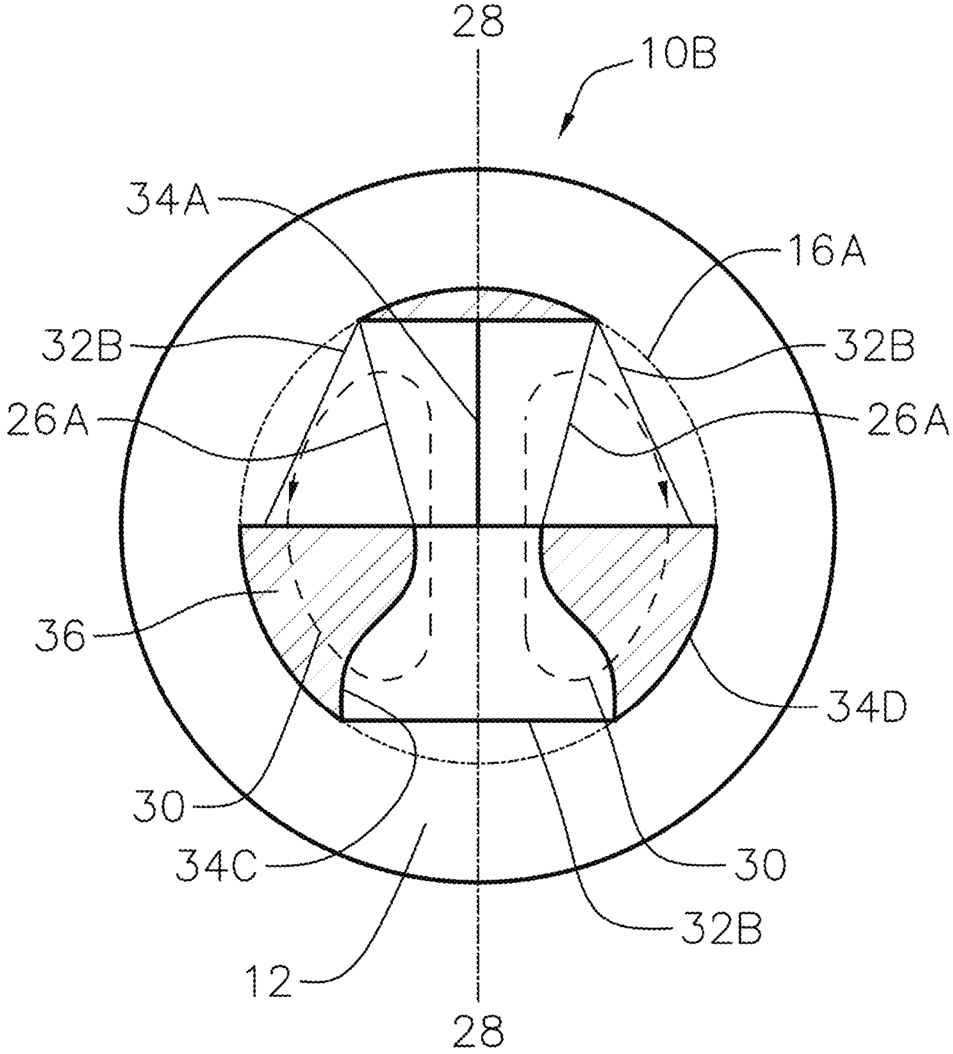
Figure 2C:
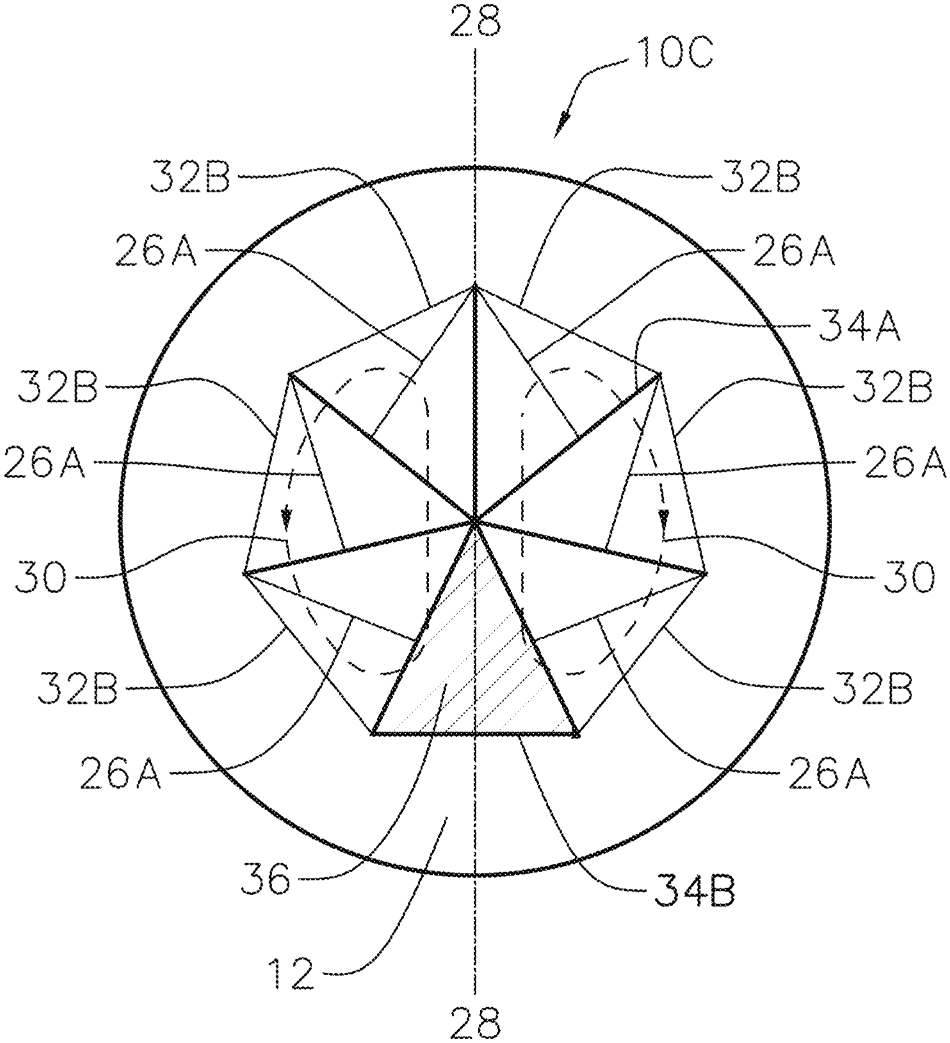

FIGS. 2A to 2C show further features, and further embodiments 10A, 10B and 10C, of the mixing device. The symmetrical pattern of internal cuts 34 may be a regular polygon (as in FIGS. 2A and 2C) or an arbitrary shape (as in FIG. 2B). The cuts may be straight (cuts 34A and 34B) or include curved edges (cuts 34C and 34D).

The cutting pattern may create voids 36 in the plate, as in FIGS. 2B and 2C, or alternatively all of the plate material may be used to form the mixing device, as in FIGS. 1 and 2A. The edges of the voids 36 may be straight (FIG. 2C) or curved (FIG. 2B). The voids may be located around the perimeter of the cutting pattern or located in the center.

The pipe 16 in which the mixing device is used may be a tubular conduit with round cross-section, or a tubular conduit of arbitrary cross-section.

At least two tabs 20 of the mixing device incorporate a fold 26 in the tab body. Each fold in the plate or in the tab (i.e., the folds 32 in the plate that form the tabs and the folds 26 within the tab bodies) may be between 0 and 90 degrees and they may be identical or different. Different tabs may have differing fold angles. Tabs may be folded so as to angle the tab upstream (see folds 32A, 26A in FIG. 2) or downstream (see folds 32B, 26B in FIG. 2). On tabs 20A in which the tab body incorporates a fold 26, the axis of the fold 32 in the plate that forms the tab and the axis of the fold 26 in the body of the tab intersect at a point outside of the tab, as shown in FIG. 2A, or on the edge of the tabs, as shown in FIGS. 2B and 2C. Folds around the perimeter of the mixing device may touch the inside surface 16A of the pipe 16 as shown in FIGS. 2A and 2C or may end at a point inside the pipe channel, as shown in FIG. 2B. The pattern of cuts and folds is symmetrical about the plane of symmetry 28.

The tabs 20 and folds 26, 32 are arranged in a manner that produces two counter-rotating vortices 30. This is depicted in FIGS. 2A, 2B and 2C, where the mixing devices 10A, 10B and 10C are shown to produce a counter-rotating vortex pair 30 with orientation as depicted when fluid is passed through the mixing device away from the viewer, and the upstream folds 32A, 26A and downstream folds 32B, 26B are located as shown. Those skilled in the art can adapt the patterns and folds to produce a variety of mixing devices that are within the scope of the invention.

Figure 5:
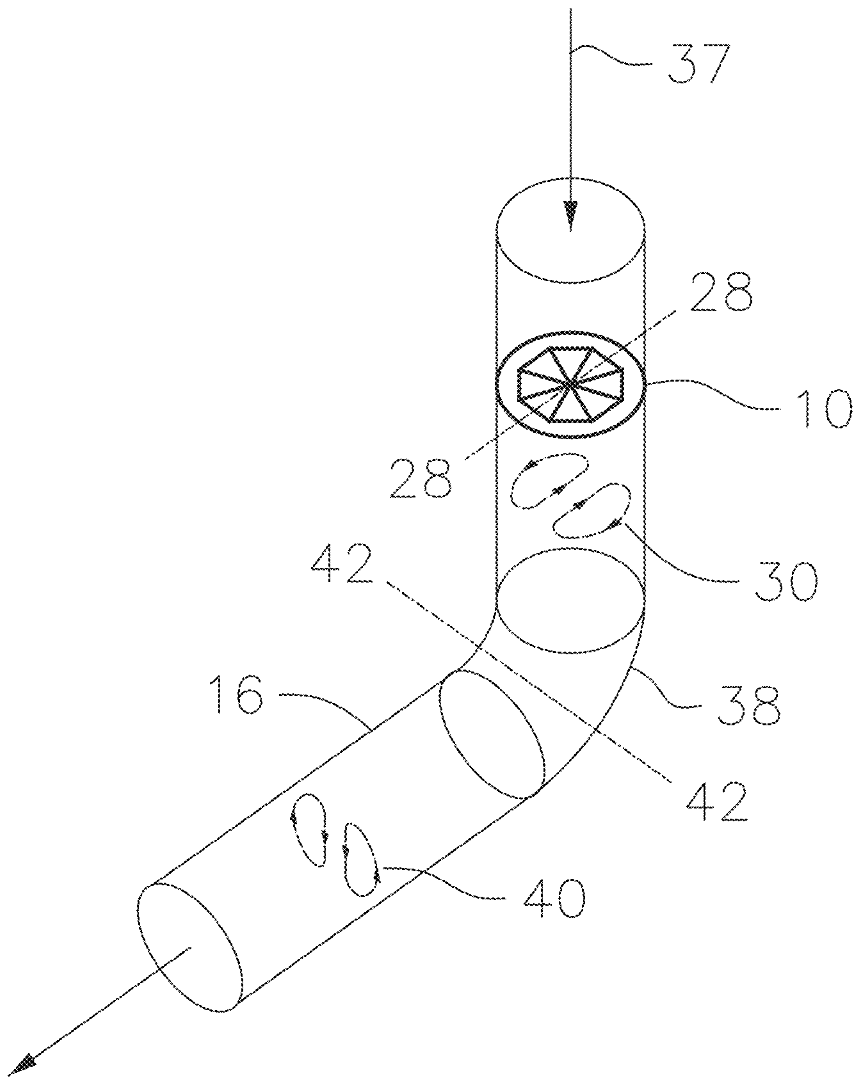
FIG. 5 is a schematic view of a mixing device according to the invention in a pipe upstream of a pipe bend.

FIG. 5 illustrates the mixing device 10 installed in a pipe 16 having a vertically-downward flowpath 37 followed by a pipe bend 38. In order to be effective in eliminating phase separation around the pipe bend 38, the mixing device 10 is oriented so that the counter-rotating vortices 30 produced by the mixing device reinforce the Dean vortices 40 that occur naturally as fluid passes through the pipe bend 38. The mixing device 10 is installed between 0 and 15 hydraulic diameters upstream of the pipe bend 38 with the plane of symmetry 28 of the mixing device aligned approximately perpendicular to the pipe bend axis 42. While perfectly perpendicular axis orientation is preferred, the mixing device can be effective when installed with up to 45 degrees of misalignment.

Figure 6:
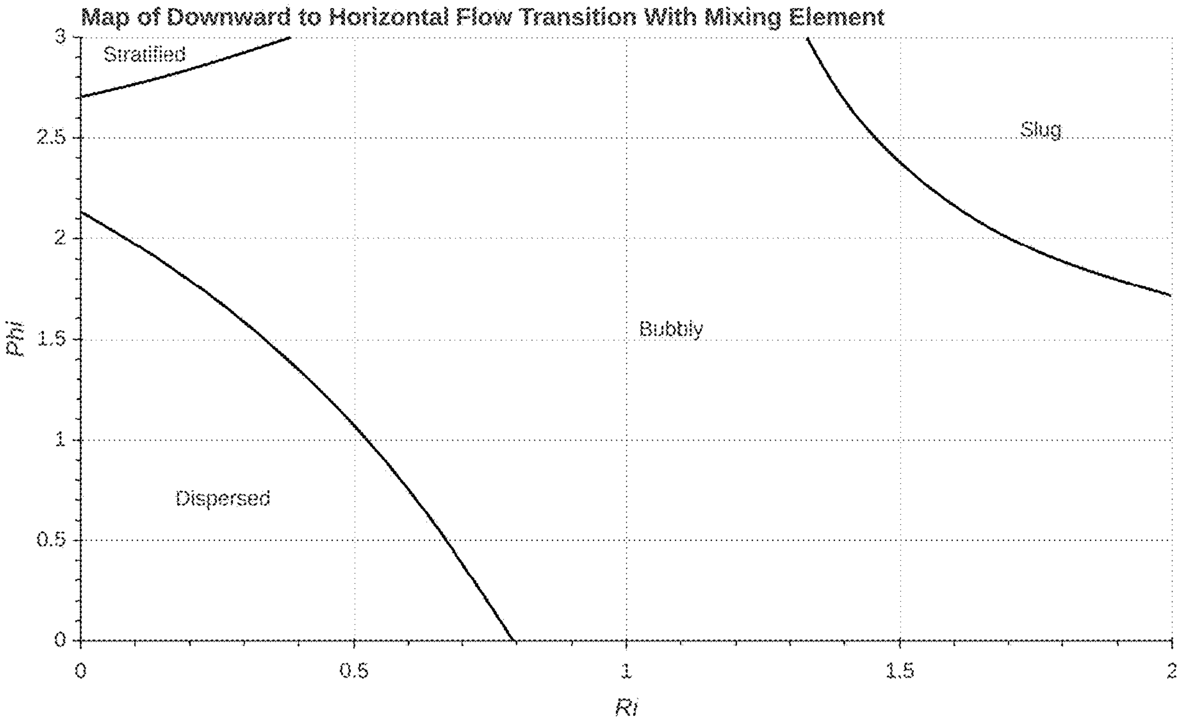
FIG. 6 is a flow map showing flow regimes in a horizontal pipe located immediately after a section of downward flow having a mixing device according to the invention, as related to the parameters $\phi$ and Ri.

Hydraulic tests on the mixing device showed that it is highly effective in preventing phase separation. When installed in a transition from vertically-downward to horizontal flow with a heavy continuous phase, the device effectively eliminated phase separation at any operating point between $0<\phi\leq 1.5$. Use of the mixing device provides stable fluid behavior in pipe bends at any operating point that would be expected to produce stable bubbly or dispersed flow regimes in sections of straight pipe in downward flow, as shown in FIG. 6.

The results in FIG. 5 present a worst case whereby the heavy phase is continuous and the transition occurs from vertical downward to horizontal flow. A second, analogous, worst case exists when the light phase is continuous and the transition occurs from vertical upward flow to horizontal flow. The mixing device 10 finds particular use is preventing phase separation in these cases. However, the device is also highly effective in preventing phase separation in other orientations and with other combinations of heavy and light phase.

References in this disclosure to "vertically-downward" or 'vertically-upward" flowpaths and the like mean flows that are at an angle of greater than 45 degrees. In practice, the flows are substantially vertical. Likewise, references to "horizontal" flows means flows that are at an angle of less than 45 degrees.

The mixing device 10 may be adapted to prevent phase separation in a conduit with a non-circular cross-section which is also known to produce Dean vortices. Again, the mixing device is particularly effective between 0 and 15 hydraulic diameters from the pipe bend.

The pressure drop of the mixing device 10 is low, typically having a loss coefficient of between 1 and 10, depending on the configuration. For example, the device depicted in FIG. 1 was found to have a hydraulic loss coefficient of approximately 3.

Alternatively, the device may also be installed in a straight section of pipe and used to improve mixing of immisible phases. The device is particularly suited to improving mixing of immiscible phases in vertical flow applications producing bubbly or dispersed flow regimes where bulk flow separation does not occur, but it is also effective in horizontal applications.

Figure 7A:
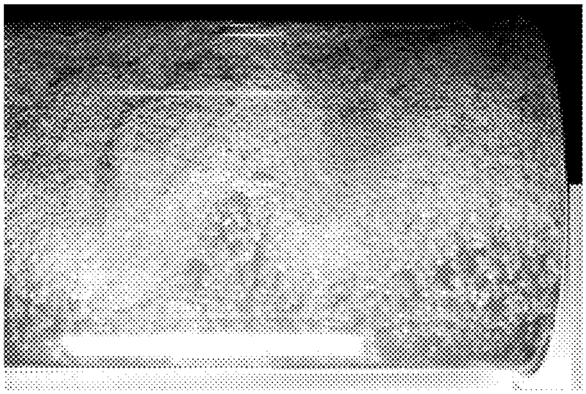
FIGS. 7A and 7B are photos showing the phase dispersion of a two phase flow, without and with a mixing device, respectively.
Figure 7B:
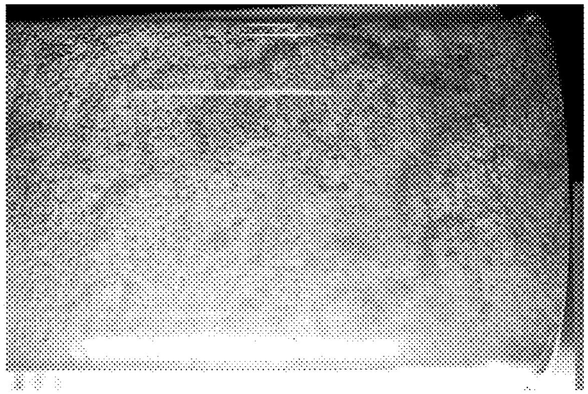

Visual comparison of the dispersions present in pipe flow with and without the mixing device 10 indicated that it is highly effective in increasing surface area in flow regimes where the phases are already largely mixed, such as in bubbly and dispersed flow regimes. The improvement in mixing and phase dispersion is seen in FIGS. 7A and 7B. The dispersed phase is more finely distributed and droplets are much more uniformly sized in the dispersion depicted in FIG. 7B, for which the mixing device was used, than in the dispersion depicted in FIG. 7A, for which it was not used. It is apparent that the mixing device of the invention improves mixing, as well as prevents phase separation.

Throughout the foregoing description and the drawings, in which corresponding and like parts are identified by the same reference characters, specific details have been set forth in order to provide a more thorough understanding to persons skilled in the art. However, well known elements may not have been shown or described in detail to avoid unnecessarily obscuring the disclosure. Accordingly, the description and drawings are to be regarded in an illustrative, rather than a restrictive, sense.

As will be apparent to those skilled in the art in the light of the foregoing disclosure, many alterations and modifications are possible in the practice of this invention without departing from the scope thereof. Accordingly, the scope of the invention is to be construed in accordance with the following claims.

The invention claimed is:

1. A system for mixing fluids, comprising:

a mixing device;

a pipe having a bend therein;

the mixing device being in the pipe upstream of the pipe bend;

two immiscible liquids flowing through the pipe;

two counter-rotating Dean vortices in the two immiscible liquids downstream of the pipe bend, induced by the pipe bend;

the mixing device comprising a plate having a flowpath therethrough for the two immiscible liquids and three or more tabs extending from the plate into the flowpath at an angle from the plane of the plate, the tabs being formed by first folds in the plate, at least two of the tabs having a second fold therein, at least one of the tabs being flat and unfolded, the tabs and first and second folds being arranged to produce two counter-rotating vortices in the two immiscible liquids passing through the pipe;

the two produced counter-rotating vortices being oriented to reinforce the counter-rotating Dean vortices.

2. A system according to claim 1, wherein the mixing device has a plane of symmetry perpendicular to the plane of the plate and the tabs and first folds and second folds form a pattern that is symmetrical about the plane of symmetry.

3. A system according to claim 1, wherein the mixing device is formed by cutting the plate and folding it to form the tabs.

4. A system according to claim 1, wherein the plate has cuts that are straight or curved.

5. A system according to claim 1, wherein the plate has voids therein.

6. A system according to claim 1, wherein the direction of the second fold in at least one tab is in a direction opposite to the direction of the first fold formed between the tab and the plane of the plate.

7. A system according to claim 1, wherein the angle formed by the second fold in each of the tabs having second folds is the same as the angle formed by the first fold.

8. A system according to claim 1, wherein the angle formed by the second fold of each of the tabs having second folds is different than the angle formed by the first fold.

9. A system according to claim 1, wherein at least some of the tabs extend from the plate in an upstream direction.

10. A system according to claim 1, wherein at least some of the tabs extend from the plate in a downstream direction.

11. A system according to claim 1, wherein the axis of the first fold and the axis of the second fold in the tab intersect at a point outside the tab.

12. A system according to claim 1, wherein the axis of the first fold and the axis of the second fold in the tab intersect at an edge of the tab.

13. A system according to claim 1, wherein the mixing device has a plane of symmetry that is perpendicular to the axis of the pipe bend.

14. A system according to claim 1, wherein the plane of symmetry of the mixing device is aligned within 45 degrees of an axis perpendicular to the axis of the pipe bend.

15. A system according to claim 1, wherein the mixing device is in the pipe a distance upstream of the pipe bend that is between 0 and 15 hydraulic diameters of the pipe.

16. A method of reducing phase separation in a flow through a pipe of a mixture of two or more immiscible fluid phases, the pipe having a mixing device upstream of a pipe bend, the mixing device comprising a plate having a flowpath therethrough and two or more tabs extending from the plate into the flowpath at an angle from the plane of the plate, the tabs being formed by first folds in the plate, at least two of the tabs having a second fold therein, the tabs and first folds and the second folds being arranged to produce two counter-rotating vortices in the fluids passing through the pipe, the method comprising:

(a) flowing the fluids through the pipe in a direction from the mixing device to the pipe bend;

(b) forming the counter-rotating vortices in the fluids as the fluids flow past the mixing device; and (c) flowing the fluids past the pipe bend and thereby inducing counter-rotating Dean vortices in the fluids, the Dean vortices being reinforced by the counter-rotating vortices formed by the mixing device.

17. A method according to claim 16, wherein the direction of the flowpath is vertically oriented.

18. A method according to claim 17, further comprising maintaining a stability parameter $\phi$ in the vertical flowpath in the interval of $0<\phi\leq 1.5$, where;

$$\phi = \frac{\beta}{a \cdot \sqrt{Ri} + b \cdot Eo + c}$$

$$a = -1.1836x10^{-1}$$

$$b = 2.2873x10^{-5}$$

$$c = 1.1904x10^{-1}$$

$$Ri = \frac{gD|\rho_c - \rho_d|}{\rho_c U^2}$$

$$\beta = \frac{Q_d}{Q_d + Q_c}$$

$$Eo = \frac{|\rho_c - \rho_d| g D^2}{\sigma}$$

$$D = \frac{4A}{P}$$

$$U = \frac{Q_d + Q_c}{A}$$

where: Ri=Richardson Number $\beta$=dispersed phase volumetric fraction

Eo=Eötvös Number

U=bulk fluid velocity

D=downflow section hydraulic diameter

A=downflow section cross-sectional area

P=downflow section cross-sectional perimeter g=gravitational acceleration constant $\rho_c$=density of continuous phase $\rho_d$=density of dispersed phase $Q_c$=volumetric flow of continuous phase $Q_d$=volumetric flow of dispersed phase, and $\sigma$=interfacial tension.

* * * * *